May 31, 1938. A. G. F. KUROWSKI ET AL Re. 20,746

COMBINED TYPEWRITING AND CARD PERFORATING MACHINE

Original Filed Jan. 2, 1926 5 Sheets-Sheet 1

Inventors:
Alfred G. F. Kurowski
and Jesse A. B. Smith
by B. C. Stickney
Attorney May 31, 1938. A. G. F. KUROWSKI ET AL Re. 20,746

COMBINED TYPEWRITING AND CARD PERFORATING MACHINE

Original Filed Jan. 2, 1926 5 Sheets-Sheet 2

Inventors:
Alfred G. F. Kurowski
and Jesse A. B. Smith
by B. C. Stickney
Attorney COMBINED TYPEWRITING AND CARD PERFORATING MACHINE
Original Filed Jan. 2, 1926 5 Sheets-Sheet 3
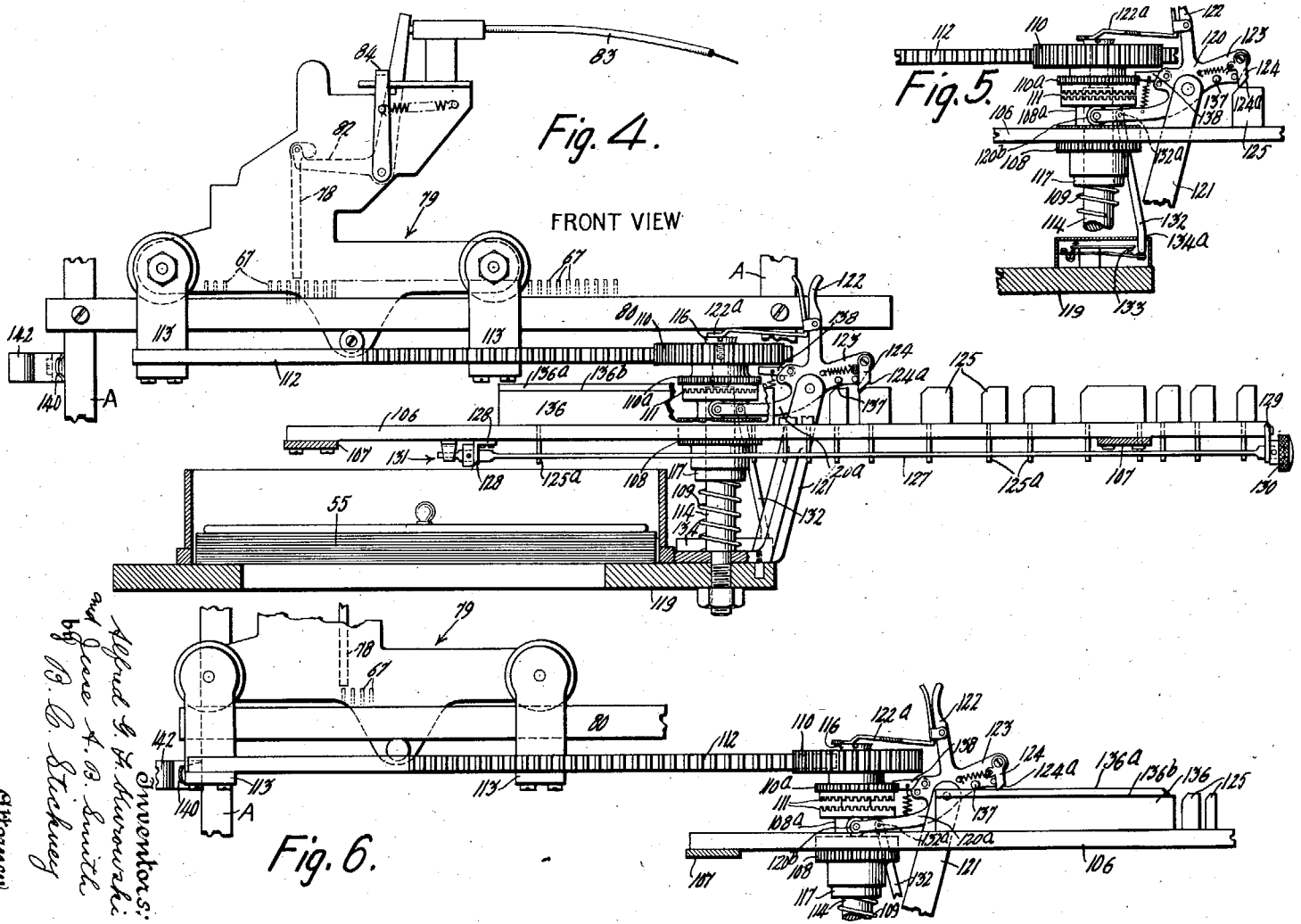
Inventors:
Alfred G. F. Kurowski
and Jesse A. B. Smith
by B. C. Stickney
Attorney.

COMBINED TYPEWRITING AND CARD PERFORATING MACHINE
Original Filed Jan. 2, 1926 5 Sheets-Sheet 4
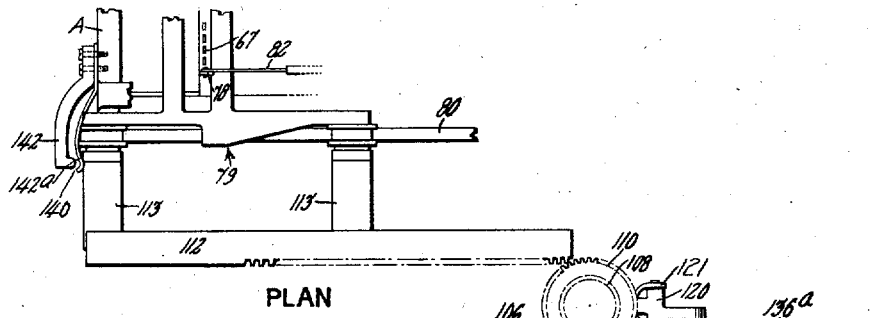
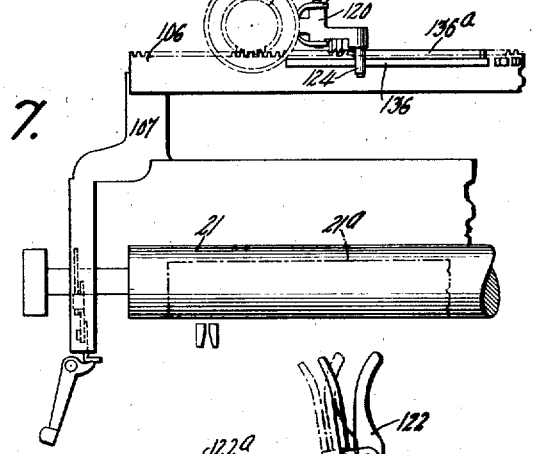
Fig. 7.
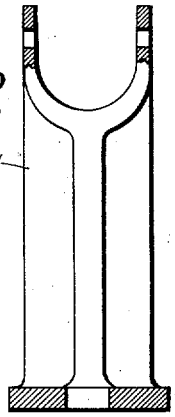
Fig. 8.
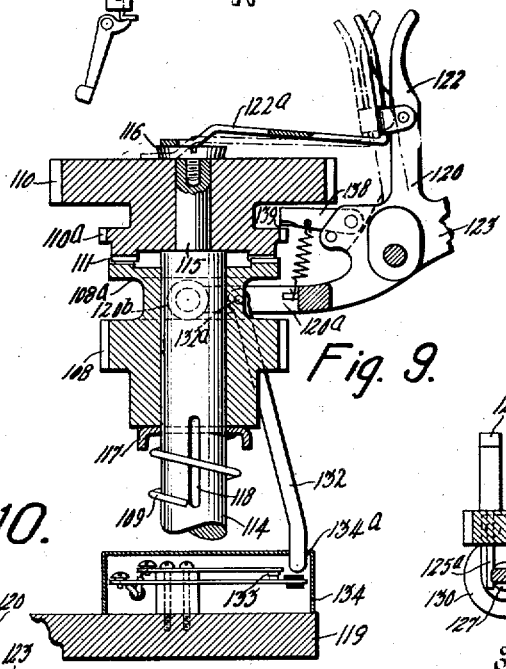
Fig. 9.
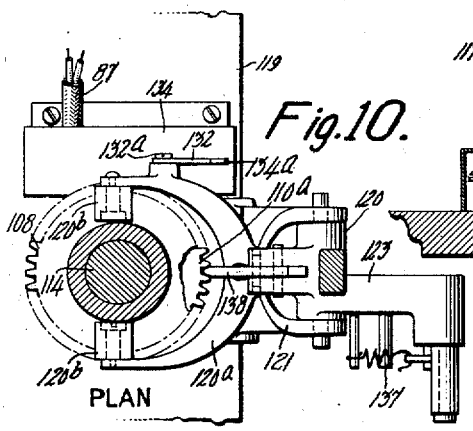
Fig. 10.
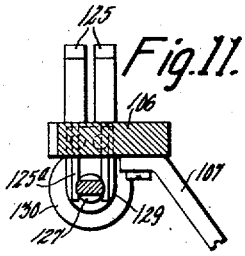
Fig. 11.
Inventors:
Alfred G. F. Kurowski
and Jesse A. B. Smith.
by B. C. Stickney
Attorney.

COMBINED TYPEWRITING AND CARD PERFORATING MACHINE
Original Filed Jan. 2, 1926 5 Sheets-Sheet 5
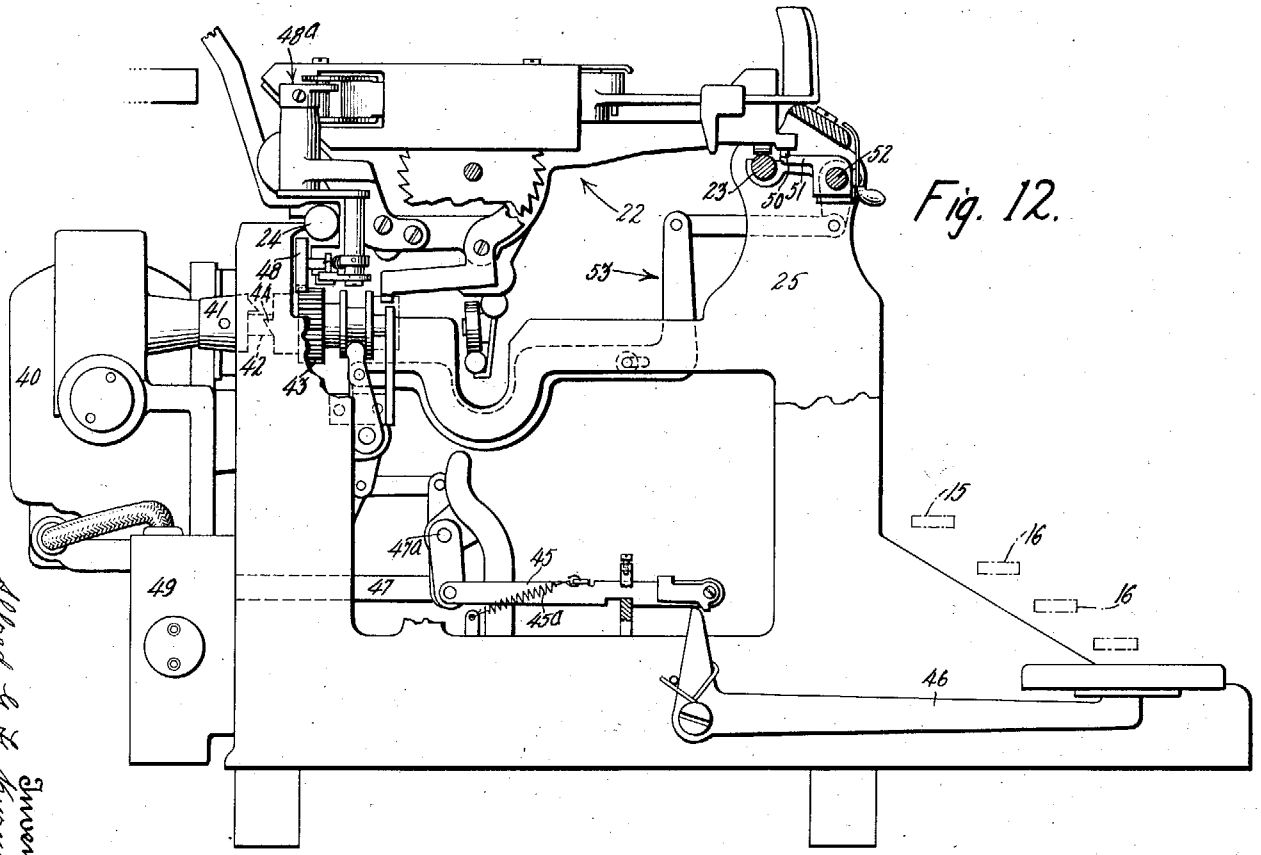
Inventors:
Alfred G. F. Kurowski
and Jesse A. B. Smith
by B. C. Stickney
Attorney Reissued May 31, 1938

Re. 20,746

UNITED STATES PATENT OFFICE 20,746

COMBINED TYPEWRITING AND CARD-PERFORATING MACHINE

Alfred G. F. Kurowski, Brooklyn, N. Y., and Jesse A. B. Smith, Stamford, Conn., assignors to Underwood Elliott Fisher Company, New York, N. Y., a corporation of Delaware Original No. 1,745,172, dated January 28, 1930, Serial No. 78,810, January 2, 1926. Application for reissue December 6, 1932, Serial No. 645,896

110 Claims. (Cl. 164—113)

This invention relates to a combined typewriting and card perforating machine, and particularly to means for coupling the typewriter and the card-perforator for joint operation.

The invention is herein described and illustrated as applied to an Underwood typewriter in combination with a Powers key-punch, said key-punch being herein called the card-perforator.

These machines are coupled for the purpose of producing a perforated record-card simultaneously with the typing of the record upon a work-sheet in the typewriter. As is well known, these cards are used in making groupings, analyses, tabulations, etc., of the items indicated by perforations in the cards. A line of data under form headings on the work-sheet may include portions which need not be transferred to the record-card. Therefore, while said portions are being typed, the perforator must be inactive.

A feature of this invention is the provision of improved coupling means whereby the joint operation of the typewriter and card-perforator may automatically be suspended and resumed at positive predetermined intervals without requiring the attention of the operative.

The card for use in a perforating machine is designed for forty-five denominational columns, each to have space for twelve holes. Ten of the hole spaces in each column are for the numerals. Above the numeral or digit spaces in each column, are two extra spaces, which are useful in grouping operations, coding, etc. These extra spaces are also combined with numeral spaces to represent alphabetical characters and other symbols. It will be understood that a space becomes effective when a hole is punched therein.

The blank card is automatically fed into the perforator so that its five hundred and forty hole-spaces are in register with a nest of five hundred and forty punches in the perforator. Said punches co-act with a perforated die-plate beneath the card to punch holes in the card. During the punching operation, the die-plate and card are raised. This raises all the punches except those over the spaces to be perforated. These are held down by rods or setting pins which were previously depressed and latched by operation of the perforator-keys. There is one setting pin in line with and over each punch. As the card and die-plate are raised, these held-down punches penetrate the card and punch a hole therein. A spring-propelled carriage having twelve key-actuated pin-setting plungers traverses the forty-five denominational columns of setting pins from left to right in escapement controlled denominational-selecting steps so that one column is set up at a time. When the carriage co-acting with the perforator-keys has traversed and set the pins so that the record holes may be punched, a punching cycle is initiated, during which a blank card is fed in and punched according to the pin-setting. While the blank card is fed in, the card punched in the preceding cycle is ejected. The pin-setting carriage is then returned manually and this return automatically restores to normal position the pins which had been set.

Previously to the present invention, the typewriter and perforator were coupled for joint operation by means which included an electric cable joining typewriter-key-actuated electric contact devices on the typewriter with electromagnetically operated devices for actuating the perforator-keys. Thus when a typewriter-key is depressed an electric circuit to and including one or more of the electromagnetic devices is established by closing said contact devices and one or more perforator-keys are actuated, it being understood that some characters are represented by two holes. With this arrangement, a foot pedal is provided whereby electric connection between the perforator and typewriter may be interrupted, with the result that during this interruption the perforator is inactive while the typewriter-keys are operated in typing portions of a line of data not used on the card. This foot pedal is actuated by the operative and its use requires considerable deftness and co-ordination in depressing or releasing it at the right time. Through inopportune connection or disconnection of the two machines by the operative in using the foot pedal, the columns on the work-sheet will get out of register with the corresponding columns on the card, and holes will be punched in the wrong card columns. An error of this kind is not apparent in most cases, except by a painstaking and tedious comparison of the perforated cards with the work-sheet.

What is provided therefore by this invention, in the preferred form herein described and illustrated, are positive coupling means whereby the typewriter-carriage in its movements drives and automatically controls the movement of the card-perforator pin-setting carriage, said coupling means including devices for automatically suspending and resuming the joint operation of the typewriter and card-perforator, so that the latter may be inactive while data not required to be punched on the card is typewritten. The feature of positively coupling the typewriter and perforator carriages is disclosed in the co-pending application of Alfred G. F. Kurowski, Serial No. 48,723, filed August 7, 1925, (now Patent No. 1,683,979, dated September 11, 1928) wherein are shown a rack on each carriage, meshing at all times with an intermediate pinion, and a modified typewriter escapement-mechanism for moving the typewriter-carriage in steps of $\frac{5}{32}$ of an inch, which is the longitudinal spacing of the holes or columns on the card. The invention disclosed in said co-pending application was for the purpose of positively connecting the two carriages and typing a printed heading on cards, which were then inserted in the perforator and punched from the pin-setting made coincidentally with the typing.

In the present invention, it is required and provision made that, while the typewriter-carriage moves in steps of letter-space extent, the card-perforator pin-setting and denomination-selecting carriage shall move in steps of denomination-spacing extent.

To this end, there is provided on the typewriter-carriage, a rack which meshes with a pinion rotatably mounted on a stationary spindle. Coaxial with said pinion and coupled therewith on the same spindle in a manner to be set forth is a larger pinion which meshes with a rack on the perforator pin-setting carriage. The spacing movements of said carriages are proportionate to their respective pinion diameters. No change is required in the typewriter escapement, but, as set forth in the aforesaid co-pending application, the propelling spring and escapement-mechanism for the perforator-carriage are dispensed with and may be omitted from the perforator, because said perforator-carriage is controlled by the typewriter carriage and its escapement-mechanism. The two aforesaid pinions are devised so that one of them slides into and out of engagement with the other in the manner of a clutch. Both pinions have interlocking clutch-teeth and the slidable pinion is actuated by a spring in one direction, and, in the opposite direction, by a disconnecting lever having one arm bifurcated and engaging an annular groove in said slidable pinion. The spring normally keeps the pinions coupled. A series of cam-blocks with flat dwells of varying extent is mounted at intervals on the upper side of the coupling rack on the typewriter-carriage. These cam-blocks, one at a time, and successively as the typewriter moves in a letter-feed direction, encounter an arm on the aforesaid disconnecting lever, and actuate said lever to disconnect the pinions and keep them disconnected while the typewriter-carriage travels the extent of the dwell on the particular cam-block which is in engagement. The length and spacing of the cam-blocks are determined by the form on the work-sheet in relation to the form on the card.

A spring-pressed one-way pawl is mounted on said arm to engage the cam-blocks and is diverted and tipped by the cam-blocks during the return movement of the carriages. When the two pinions are disconnected, a spring-pressed extension on the disconnecting lever enters one of the circumferential notches provided in the pin-setting carriage pinion, and in this manner holds said carriage while thus disconnected from the typewriter-carriage. It is necessary that this extension of the lever be spring-pressed because it encounters one of the teeth between the notches as soon as the disconnecting lever begins to move, and said extension must yield until the pinion has been sufficiently rotated to allow the beveled-edge of said extension to slip into the notch.

The present invention retains and uses the key-actuated electric contact devices on the typewriter joined by a cable to electromagnetic devices for actuating the perforator-keys. To completely suspend the joint operation of the two machines it is necessary, besides disconnecting the carriages, that the electric connection between the machines be interrupted, else whenever a typewriter-key is actuated, a pin or pins will be set up in the perforator at the column where the perforator-carriage stops when the two carriages are disconnected. If this column is to be skipped when joint operation is resumed, it would contain an unwanted pin-setting.

Provision is made, therefore, of means for interrupting the electric connection between the two machines when their carriages are disconnected. Said means consist of a pair of spring-pressed contacts which are arranged to open when the pinion disconnecting lever is actuated. These contacts are connected in the common lead to the electro-magnets to make and break the circuit for said magnets.

Provision is also made of means for manually disconnecting the two machines so that the typewriter may be used alone in regular typing work. This is done by providing the disconnecting lever with a handle and suitable means for holding the lever in disconnected position.

When the carriages are moved forward in letter-feed and pin-setting steps, intervals may occur, as already explained, during which the typewriter-carriage moves, but the perforator-carriage is stationary. During such intervals the coupling pinions are disconnected. Thus the typewriter-carriage moves through a greater number of steps than the perforator-carriage. In returning the carriages, the perforator-carriage reaches its starting point and encounters a stop before the typewriter-carriage, because, during the return movement, the pinions are not disconnected at intervals, due to the pawl on the disconnecting lever being diverted by and trailing over the cam block.

It is necessary, therefore, that the length of the coupling rack on the perforator be of such extent in relation to its pinion that the teeth of said pinion may escape from the end of said coupling rack when the perforator-carriage has returned to its starting position. The typewriter-carriage may then be further returned until its starting position is reached. A spring suitably applied to the perforator-carriage and its rack presses said rack toward and against its pinion, so that the pinion will pick up the rack as soon as the carriages are to start forward again. At the end of the return movement of the perforator-carriage, this spring will be slightly stressed, the rack moving a slight distance beyond the normal stopping point before the teeth of the pinion escape while the typewriter-carriage is completing its return movement.

It has been explained how the pawl on the disconnecting lever is diverted and tipped by the cam-blocks during the return movement of the typewriter-carriage. Means are provided, therefore, in this invention for restoring the pawl to its normal position relative to said disconnecting lever. This is necessary when a carriage disconnecting cam-block is in engagement at the beginning of the line. Such a cam-block is provided, therefore, with an elevated surface which engages a stud in the disconnecting lever. At the end of the return movement of the typewriter-carriage, the pawl end of the disconnecting lever is thereby raised to enable the tip of the pawl to clear the cam-block, so that said pawl may swing back to its normal position.

Other features and advantages will hereinafter appear.

In the accompanying drawings,

Figure 4 is a front elevation in detail of the coupling means between the carriages of the two machines, and includes a fragmentary view of the perforator-frame and pin-setting carriage.

Figure 5 is a front elevation, and shows in detail the disconnecting means actuated by one of the cam-blocks.

Figure 6 is a front elevation, and shows the means for operating the disconnecting lever and restoring the pawl thereon at the end of the carriage return.

Figure 7 is a fragmentary top plan view of the two carriages, and shows how the pin-setting carriage and rack are devised to allow the teeth of the pinion which drives said rack to escape from said rack when the perforator-carriage has been returned to its starting point.

Figure 8 is a detail view of the disconnecting lever bracket.

Figure 9 is a front elevational detail view of the coupling pinions and mounting, and includes a fragmentary view of the disconnecting lever.

Figure 10 is a top plan view of the pinion disconnecting lever and pawl and some of the related parts.

Figure 11 is a detail end view showing the method of securing the cam-blocks when mounted in the coupling rack of the typewriter-carriage.

Figure 12 is a side view of the means used for returning the typewriter-carriage by power.

Figure 1:
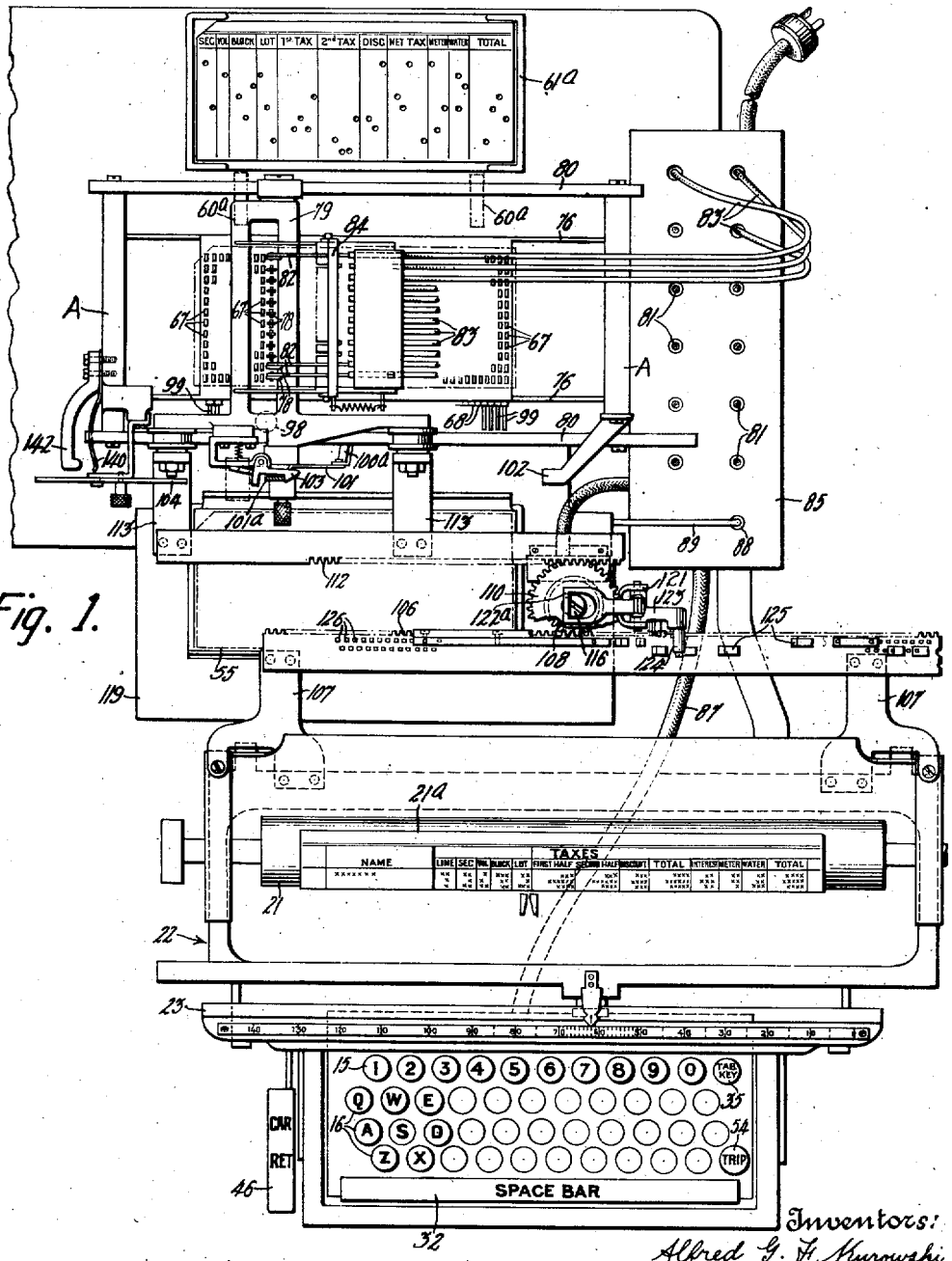
Figure 1 is a top plan view of a typewriter and part of a card-perforator, and shows the means for intermittently coupling the carriages of the two machines. This view also shows a form of work-sheet and perforated card.

Numeral keys 15 and alphabet keys 16 when depressed swing key-levers 17 about a fulcrum-rod 18 to actuate bell-cranks 19 to swing type-bars 20 upwardly and rearwardly against the front face of a platen 21. The platen is revolubly mounted within a carriage 22 which moves upon carriage rails 23 and 24 on the main frame 25. A work-sheet 21a is introduced at the rear of said platen and fed around it by the usual means. Said carriage is urged from right to left by a spring motor 26 on the typewriter-frame. A strap 27 connects the spring motor to the carriage. The type-bars engage a universal bar 28, movable rearwardly, to actuate an escapement-rocker 29 carrying escapement-dogs 30, which co-operate with the teeth of an escapement-wheel 31 to effect step-by-step letter-space movements of the carriage at the actuation of each key or space-bar 32. The escapement-wheel is rotated in one direction by a pinion 33, which is driven by a feed-rack 34 supported by arms 34a pivoted to the carriage-frame.

A tabulating mechanism may be used to advantage with this invention, and is of the type which consists of a tabulator-key 35 pivoted on the rod 18 and provided with a draw-link 36 that connects with a rocking bar 37 carrying a series of stops 38. By depressing the tabulator-key these stops move into the path of a carriage-stop 38a, and simultaneously the carriage feed-rack 34 is raised from engagement with the pinion 33, so that the spring motor 26 may effect column skipping or tabulating.

Power-driven means for returning the typewriter-carriage may be of the type disclosed in the co-pending application of Alfred G. F. Kurowski, Serial No. 41,507, filed July 6, 1925 (now Patent No. 1,679,727, dated August 7, 1928). Said means (see Figure 12) include an electric motor 40 suitably geared to a clutch-member 41 which is keyed to a shaft 42 on which is slidably mounted a clutch-pinion 43 having teeth 44 to engage said clutch-member 41. The clutch-pinion 43 is operatively connected to a spring-pulled latch-link 45 which serves to keep the clutch disengaged. Said latch-link 45 may be tripped to engage the clutch by means of a lever and key 46 conveniently located near the typewriter keyboard. Said lever when operated raises the forward end of the latch-link until a latching notch therein escapes from a holding edge. A spring 45a then pulls the latch-link rearwardly to effect engagement of the clutch. When the latch-link is tripped to engage the clutch, a rearward extension 47, connected to said latch-link by means of a short shaft 47a, serves to close a circuit to the motor by means of suitable contacts within the switch-box 49, thereby starting the motor 40. The clutch-pinion 43 meshing with a rack 48 mounted on the typewriter-carriage then drives said carriage in its return movement. Said rack is mounted and arranged to actuate a line-spacing mechanism 48a before it picks up the carriage. When the carriage reaches the end of this return movement, a cam 50 on the carriage rocks the shaft 52 by means of a settable dog 51. This disengages the clutch-pinion 43 by means of the arm-and-link connection 53 to the slidable clutch-pinion 43. At the same time the latch-link 45 is restored, the circuit to the motor is broken, and the motor stopped.

A trip-key 54 is provided at the typewriter keyboard for starting an operating cycle of the card-perforator. Said card-perforator is the well-known Powers key-punch. This perforating cycle must precede the return of the carriage.

During this cycle a blank card 55a is picked from a stack 55 by means of a reciprocating picker 56 and pushed through a one-card aperture 57, and thence to feed-rolls 58, 59 and 60. These rolls carry the card into punching position determined by stops 61. In this position the card overlies a die-plate 62 which may co-act with punches 63, as will be shown. The feed-rolls 60 bear upon the card with limited pressure, so that they may slip over the surface of the card when it reaches the stops 61.

The upper ends of the punches are guided by close fitting holes in a plate 64 supported by a machine frame A. The punches are prevented from falling through by having enlarged heads 65. The punches 63 are guided by having a working fit in a bar 66, and the die-plate 62, forming a part of a frame 63a, after receiving a card, is moved upward and presents the card to the punches. This effects perforation of the card when a punch or punches are held down. Punches not held down are carried upward by the card. After a card is perforated it remains in place under the punches until another perforating cycle is initiated. At the beginning of such a cycle the stops 61 are withdrawn by cam devices, not shown, and the feed-rolls 60 are then free to pass the card to rolls 60a and thence into a receptacle 61a.

Each punch, of which there are five hundred and forty arranged in forty-five denominational columns of twelve digit punches, has above and in line with it a pin 67 which may be pushed down and latched, so that its lower end stops the punch as the card moves upward and is pierced thereby.

Each column of twelve pins has a latch-bar 68 provided with suitable edges to interlock with edges 69 on the pin 67 to hold said pin down when depressed. Each latch-bar and its associated twelve pins are devised to co-act in a manner well known in the adding machine art, so that a depressed pin or pins are restored by depressing another pin or pins in the same column. When a latch-bar is withdrawn from a depressed pin, the pin is restored by a spring 70 which presses the pin upwardly until a collar fastened to the pin strikes a plate 71. The lower end of the spring re-acts against a plate 72. Said plates 71 and 72 have holes which fit and guide the lower ends of pins, and said plates are fastened to bars 73 supported by the machine-frame A. The upper ends of the pins are guided by holes in plates 74 and 75 supported by cross-bars 76 fastened to the machine-frame A. The latch-bars 68 are slidably supported in the cross-bars 76 and are pressed against the pins by springs 77. Thus there is a bank of setting pins over the punches and wherever a hole is to be punched a pin is depressed and latched by its corresponding latch-bar 68.

To effect setting of the pins, the perforator is ordinarily provided with a keyboard of twelve keys. These twelve keys correspond to the twelve hole spaces of each card column. Co-acting with said keys are twelve pin-setting plungers 78 arranged to traverse the bank of setting pins 67 in a carriage 79. Said carriage is retained and guided by rails 80 supported by the machine-frame A.

As shown in the aforesaid co-pending application, No. 48,723 relating to a combined typewriter and card-perforator, the regular perforator-keys are replaced by solenoid-actuated plungers 81. The solenoids 143 (Figure 3) are mounted within a box 85 (Figure 1), and the plungers are operatively connected to the pin-setting plungers by means of flexible push wires and bell-crank levers 82, to the horizontal arms of which the upper ends of the pin-setting plungers 78 are attached. The flexible push wires are enclosed in flexible sheaths 83. A universal bar 84 spring-pressed against the vertical arms of the bell-crank levers 82 keeps the pin-setting plungers normally up.

Figures 2, 3:
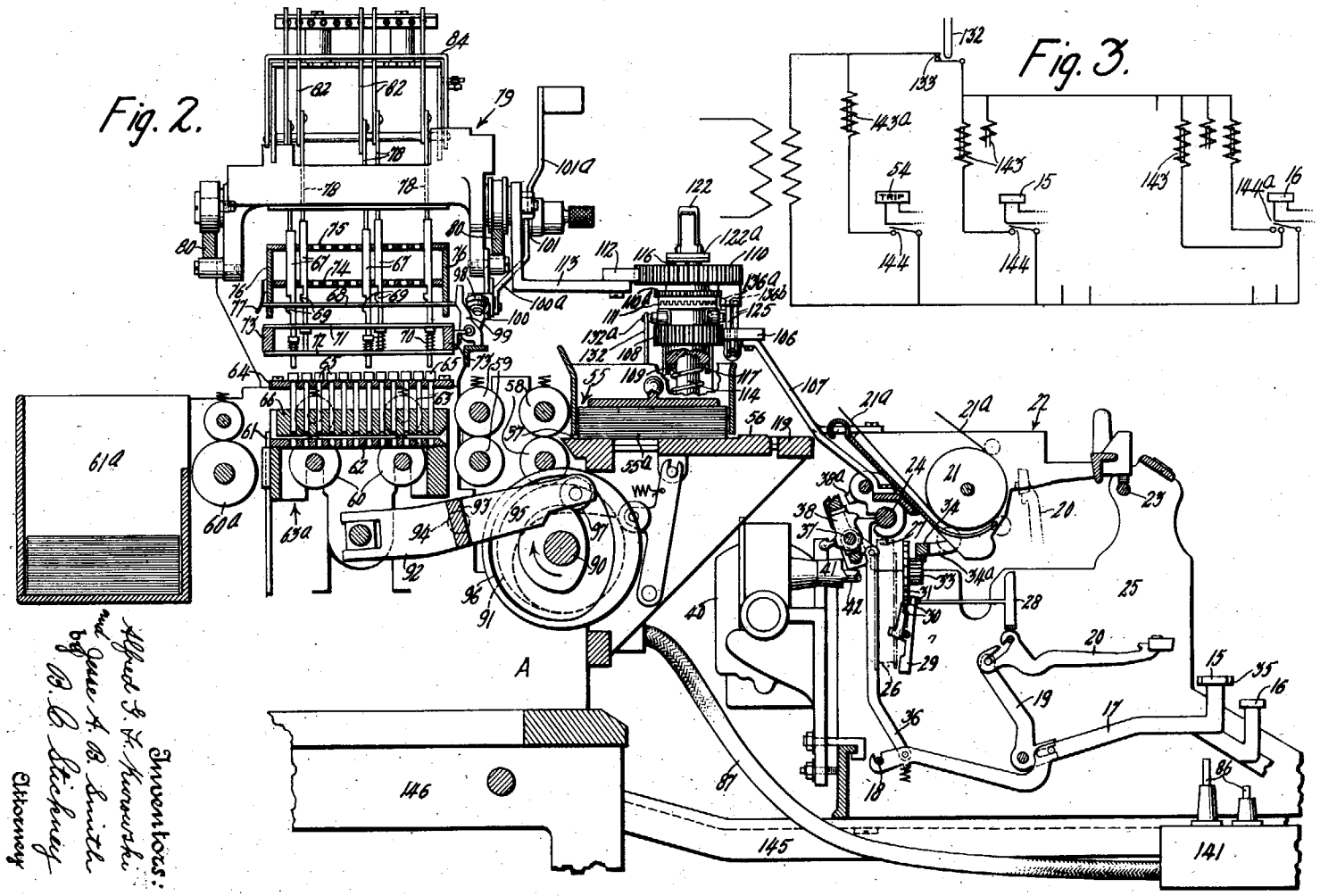
Figure 2 is a cross-sectional side elevation of the typewriter and card-perforator, and shows the coupling means between the carriages of the two machines.
Figure 3 is diagram indicating how the electrical devices are connected.

Each solenoid 143 is in a normally open electrical circuit which includes a source of current and a pair of separated contact devices 144 (Figure 3). These contact devices underlie the typewriter-keys 15 and 16 and are arranged within a case 141 through the top of which extend insulated plungers 86 by means of which the typewriter-keys when depressed close the contacts to energize the solenoids. When typing a character represented by two holes in the card, the corresponding typewriter-key closes two sets of contacts 144a (Figure 3), so that two solenoids are energized and two pins set. The wires between the contacts on the typewriter and the solenoids on the perforator are gathered into a cable 87.

The trip-key 54, like the typewriter-keys, is effective to actuate a solenoid 143a within the box 85. A plunger 88, by means of the flexible push wire within a sheath 89, is capable, when actuated by the solenoid, of operating a clutch mechanism, not shown, to start a cycle of the perforator. The details of this clutch-mechanism and its mode of operation are shown in the patent to Lasker, No. 1,352,006, dated September 7, 1920. The plunger 88 of the present invention replaces the controlling key shown in said patent to Lasker.

Operation of the clutch-mechanism connects the machine shaft 90 to a continuously rotating motor-driven disk, not shown. At the end of one revolution said machine shaft is automatically disconnected from the driving disk. During this revolution the feed-rolls 58, 59, 60 and 60a are rotated by means of the gear 91 on shaft 90. The frame 63a in suitable guides is moved up and down by means of arms 92 extending from the ends of a rocker-bar 93 pivoted at each end to the machine-frame A at 94. Said rocker-bar is rocked by means of an arm 95 projecting from the middle thereof, and which engages a grooved-face cam 96 by means of a follower roll 97.

After the perforating cycle, return of the pin-setting carriage is effected, in a manner that will be shown, by depression of the carriage return-key 46 (Figure 12), and, during this return, pins 67 are restored by means described in the aforesaid co-pending application No. 48,723, relating to a combined typewriter and card-perforator. Said means include a roll 98 which is normally ineffective to operate the pin-restoring levers 99. Said roll 98 is mounted upon a lever 100 pivoted upon the pin-setting carriage and connected by a link 100a to another lever 101, also pivoted upon the pin-setting carriage.

During the final movement of the pin-setting carriage said lever 101 is rotated when a vertical arm 101a thereof meets an extension 102 from the machine-frame A. Said arm 101a is then caught and held by a latch 103 pivoted upon the pin-setting carriage. The roll 98 is thus depressed and held in a positon where it is effective to actuate the pin-restoring levers 99 during the return movement of the pin-setting carriage. Said pin-restoring levers in turn push the latch-bars 68 endwise to release pins that have been set. At the end of the return movement of the pin-setting carriage, the latch 103 when it meets an adjustable stop 104 is rotated and withdrawn from the arm 101a. A suitable spring, not shown, then restores the lever 101, so that the roll 98 thereon is raised out of engagement with the pin-restoring levers.

The perforator pin-setting and denomination-determining carriage 79 is driven and controlled by the typewriter-carriage 22. To this end, a rack 106 is supported by means of brackets 107 upon the typewriter-carriage and meshes with a pinion 108. Said pinion 108 is coupled to a larger pinion 110, which it may drive by means of the clutch-teeth 111 in both pinions. The pinion 110 meshes with a rack 112 mounted on brackets 113 projecting from the pin-setting carriage. Both pinions are revolubly mounted upon a stationary spindle 114, shown in detail in Figure 9. The spindle is reduced in diameter at its upper end to form a shoulder 115, which, in conjunction with a screw-head 116, retains the upper pinion 110. The lower pinion 108 may slide along the spindle, but is normally coupled to the upper pinion by means of a spring 109. A washer 117 is interposed between the spring and lower pinion with which it may freely slide up and down, but said washer is prevented from turning by engaging a slot 118. Said spindle 114 is suitably mounted upon a platform 119 of the card-perforator (see Figure 2).

The diameters of the pinions are proportioned so that steps of letter-space extent of the typewriter-carriage will produce steps of denomination-spacing extent of the pin-setting and denomination-determining carriage. A forward or pin-setting movement of the pin-setting carriage is from left to right, while a forward or letter-feed movement of the typewriter-carriage is from right to left. Thus the carriages move in opposite directions. The stepping movement of both carriages is controlled by the spring motor and escapement-mechanism of the typewriter, the escapement-mechanism and spring-motor of the perforator being dispensed with.

When it is desired to use the typewriter alone in regular typing work, the lower pinion 108 may be separated from the upper pinion 110 by means of a disconnecting lever 120 pivoted in a bracket 121 mounted upon the platform 119 of the perforator. Said disconnecting lever has an arm 120ᵃ bifurcated to embrace and engage the lower pinion by means of an annular groove 108ᵃ therein and rolls 120ᵇ. Said disconnecting lever may be manipulated by means of a handle 122 thereon, when it is desired to use the typewriter alone in regular typing work. From this handle extends a clip 122ᵃ, which may be caught by the edge of the screw-head 116 to hold the lever in a position for disconnected pinions. When said pinions are disconnected, the connection between the typewriter-keys and perforator-setting mechanism also becomes inoperative, as will be shown.

For the purpose of this invention, means are provided to automatically actuate the disconnecting lever before and after typing certain parts of a line on the work-sheet not required to be punched in the card. To this end, the disconnecting lever 120 is provided with an arm 123 carrying a spring-pressed one-way pawl or trip 124. Said pawl or trip has an inclined cam-face 124ᵃ by which it may ride over cam-blocks or tappets 125 and be lifted thereby during a letter-space movement of the typewriter-carriage to effect the separation of the pinions, prevent the setting of the punches and establish a non-punching setting zone, as shown in Figure 6.

It is necessary to use a pawl on the disconnecting lever, because said lever must be disengaged from the cam-block at the end of the last step thereon. In this way the typewriter-carriage pinion does not rotate while being reconnected to the pin-setting carriage pinion. This necessitates an abrupt disengagement of the disconnecting lever from the cam-blocks and is accomplished by having shear surfaces at the ends of the cam-blocks and at the escaping edge of the disconnecting lever. Said escaping edge must therefore be in the form of a tripping pawl so as not to vibrate the lever 120 during a return movement of the typewriter-carriage.

The cam-blocks 125 vary in length predetermined by the number of letter-space distances the typewriter-carriage is to take while joint operation is suspended. Said cam-blocks have square stems 125ᵃ, by means of which they are secured to the coupling rack 106 on the typewriter-carriage. These stems closely fit and extend through square holes 126, spaced in staggered arrangement in said coupling rack. A locking bar 127 rotatably mounted in brackets 128 and 129 (see Figure 4) and provided with a knob 130 and detent devices 131 secures the cam-blocks in a manner clearly shown in Figure 11. A quarter turn of the locking bar frees the stems of the cam-blocks when it is desired to withdraw the cam-blocks or rearrange them upon the coupling block 106.

When the disconnecting lever is actuated to disconnect the pinions, a rod 132 pivoted to said disconnecting lever at 132ᵃ is thrust downward. This separates electrical contacts 133 contained in a box 134 having a suitable slot 134ᵃ to guide said rod. Said contacts are in the common lead to the electromagnets (see Figure 3), and when separated the magnets cannot be energized when the typewriter-keys are actuated. Thus complete automatic suspension of joint operation of the typewriter and card-perforator is accomplished, through disconnection of their respective carriages and breaking of the electrical connection between the two machines by means of the aforesaid disconnecting lever and cam-blocks. Joint operation is resumed when the escaping edge of the disconnecting lever pawl drops off the cam-blocks.

The work-sheet 21ᵃ in the typewriter, Figure 1, shows a form-heading beginning with a name. Lines entered under this heading begin with data not wanted on the card. In such cases when suspension of joint operation of the two machines occurs at the beginning of a line, a modified cam-block 136 is provided to effect disconnection of the two machines. This cam-block differs from the other cam-blocks in having an auxiliary cam-surface 136ᵃ elevated above the regular surface 136ᵇ. By means of a pin 137 in the arm 123 of the disconnecting lever 120, this auxiliary cam-surface serves to disconnect the pinions, break the contacts 133, and raise the pawl end of the disconnecting lever, so that the tip of the pawl swings clear, and the pawl may resume the normal effective position from which it was tipped by the return movement of the carriage. Neither the regular cam-blocks 125 nor the modified cam-block 136 moves the disconnecting lever 120 enough to permit the clip 122ᵃ to be caught by the screw-head 116.

When the carriages are disconnected, the pin-setting carriage must be positively held. Therefore, the pinion 110 is provided with circumferential notches 110ᵃ, into one of which a spring-pressed extension 138 of the disconnecting lever enters. The pinion 110 is rotated when the disconnecting lever moves to disconnect the lower pinion. Said extension thus encounters one of the teeth between the notches 110ᵃ, and must yield until the pinion has been sufficiently rotated to allow the extension, which has a slightly beveled edge, to slip into the succeeding notch. The clearance 139 (Figure 9) must be so proportioned that the under surface or edge of the extension meets the upper surface of a tooth in order that the extension may easily override the tooth and slip into the succeeding notch.

During the forward movement of the typewriter-carriage, the pin-setting carriage is disconnected and stationary at intervals, and thus the typewriter-carriage moves through a greater number of steps than the pin-setting carriage. But during the greater part of the return movement of the carriage, the disconnecting lever is inoperative, due to the pawl thereon being tipped by, and trailing over, the cam-blocks. Therefore, whenever there are intervals of disconnected carriages during the forward movement, the pin-setting carriage, during the return movement, will reach its starting point and encounter a stop before the typewriter-carriage. The pin-setting carriage rack 112 is of such length, therefore, that only the last tooth thereon is in engagement with its pinion when the pin-setting carriage has reached its starting position. One or two steps before this, the pin-setting carriage has engaged and stressed a spring 140 fixed to the machine-frame A, and, as the typewriter-carriage completes its return movement, this spring is stressed a little more by a slight further movement of the pin-setting carriage which occurs as the teeth of its pinion push aside said last tooth of the rack and escape therefrom. This results in a ratchet-like action between the last tooth on the rack and the teeth of the pinion. As each pinion tooth escapes, said rack is pressed back toward and against the pinion, so that the pinion will readily pick up the rack as soon as both carriages are to start forward again. A stop 142 which backs up the spring at 142a prevents excess return movement of the pin-setting carriage. The linear pitch of the rack 106 and pinion 108 equals the letter-feed pitch of the typewriter-carriage. In order that the pinions, racks and the parts related thereto may not get out of register with each other it is necessary that the pinions 108 and 110 have the same number of teeth, and that the number of notches 110a and the number of clutch-teeth 111 equal the number of teeth in each pinion. Thus one step of each carriage is equivalent to a notch-to-notch or tooth-to-tooth movement. The typewriter is mounted upon a suitable frame 145 extending from and supported by the perforator-machine-frame.

Variations may be resorted to within the scope of the invention, and portions of the improvements may be used without others.

Having thus described our invention, we claim:

1. In a combined typewriting and perforating machine, the combination with a movable typewriter-carriage having a rack, typewriter-keys, perforator-setting mechanism including a movable carriage having a rack, and connections whereby said typewriter-keys may be effective to actuate said perforator-setting mechanism, of coupling and uncoupling means, whereby said carriages are connected or disconnected, said coupling and uncoupling means consisting of two coaxially-mounted pinions, each one thereof engaging one of said racks, and each one thereof having clutch-elements, whereby said pinions are coupled or uncoupled, one of said pinions being slidable into and out of engagement with the other pinion by means of a spring and a lever, said lever being actuated to uncouple said pinions against the reaction of said spring by means of cam-surfaces embodied in or upon said typewriter-carriage or its aforesaid rack, said cam-surfaces becoming effective as said typewriter-carriage moves into and in predetermined zones with which said cam-surfaces are coextensive, and means actuated by said lever, whereby the aforesaid connections between the typewriter-keys and the perforator-mechanism are rendered effective or ineffective when said carriages are connected or disconnected.

2. In a combined typewriting and perforating machine, for simultaneously producing work-sheets and perforated cards, the combination with a typewriter-mechanism including a carriage movable in letter-feeding steps, a perforator-mechanism, and coupling and uncoupling means including a rack on said carriage, whereby said typewriter-mechanism and said perforator-mechanism are connected for joint operation, or whereby they are disconnected for operating the typewriter-mechanism alone, of interchangeable or adjustable actuating means consisting of units or combinations that may be attachably and detachably mounted upon said typewriter-carriage or its coupling rack, and whereby said coupling and uncoupling means are automatically actuated and sustained by and during the movement of said typewriter-carriage into, in, and out of predetermined zones, said actuating means being interchangeable or adjustable to correspond with different forms of work-sheets and cards.

3. In a combined typewriting and perforating machine, the combination with a typewriter-carriage movable in letter-feeding steps, typewriter-keys, a movable perforator-carriage, perforator-setting mechanism, and connections whereby said keys may be effective to operate said perforator-setting mechanism, of coupling and uncoupling means whereby said carriages are connected to move in unison, or disconnected for movement of said typewriter carriage alone, and whereby said connections are rendered effective or ineffective, and means embodied in or upon said typewriter-carriage whereby said coupling and uncoupling means are automatically actuated and sustained by and during the movement of said typewriter-carriage into, in, and out of predetermined zones.

4. In a combined typewriting and perforating machine, the combination of a typewriter-carriage movable in letter-feeding steps, a perforator-carriage movable in hole-spacing steps, and means for coupling said carriages, said means for coupling said carriages consisting of a rack on said typewriter-carriage, a rack on said perforator-carriage, and compounded pinions connecting said racks and meshing therewith, whereby said typewriter-carriage, while moving in steps of letter-spacing extent, drives and moves said perforator-carriage in steps of hole-spacing extent.

5. In a combined typewriting and perforating machine, the combination of a typewriter-carriage movable in letter-feeding steps and having a rack, a movable perforator-carriage having a rack, two co-axially-mounted pinions, each of said pinions engaging one of said racks, said pinions being provided with coupling means whereby said typewriter-carriage, through its related rack and pinion, engages and drives the other pinion and its related rack on said perforator-carriage, and means for sliding one of said pinions into or out of engagement with the other pinion, said means for thus sliding one of said pinions being operable manually, and operable automatically by means made effective by the movement of said typewriter-carriage into and out of predetermined zones.

6. In a combined typewriting and perforating machine, the combination with a typewriter-carriage, a perforator-carriage, each carriage having advance and return movements, a stop for each carriage for limiting its return movement, and coupling means whereby said typewriter-carriage, in its advance movement, intermittently drives said perforator-carriage, but whereby in its return movement, said typewriter-carriage drives said perforator-carriage to its aforesaid stop before said typewriter-carriage has reached its aforesaid stop, of means to enable said typewriter-carriage to continue its return movement and reach its stop after said perforator-carriage has reached its stop.

7. In a combined typewriting and perforating machine, the combination with a typewriter-carriage, a perforator-carriage, each carriage movable in advance and return directions, the advance movement of said typewriter-carriage exceeding in number of steps the advance movement of said perforator-carriage, a stop for each carriage for limiting its return movement, and coupling means whereby said typewriter-carriage drives and moves said perforator-carriage, of means whereby said typewriter-carriage may continue in a return movement after moving said perforator-carriage to its stop.

8. In a combined typewriting and perforating machine, the combination with a typewriter-carriage, a perforator-carriage, each carriage movable in advance and return directions, a stop for each carriage for limiting its return movement, and coupling means whereby said typewriter-carriage drives and moves said perforator-carriage, of means whereby said typewriter-carriage may continue in a return movement after moving said perforator-carriage to its stop.

9. In a combined typewriting and perforating machine, the combination of a typewriter-carriage, a perforator-carriage, each carriage movable in advance and return directions, a stop for each carriage for limiting its return movement, coupling means including a toothed rack on said typewriter-carriage, a toothed rack on said perforator-carriage, and a toothed gear-device connecting said racks, the last tooth only on the perforator-carriage-rack engaging said gear-device when said perforator-carriage has reached its return stop, thereby enabling the teeth of said gear-device to escape from the end of said rack when said typewriter-carriage is returned beyond a point corresponding to the end of the perforator-carriage-return stop, and means for pressing the end of said rack toward or against said gear-device when said perforator-carriage has reached its return stop.

10. In a combined typewriter-mechanism and perforator-mechanism, the combination of a typewriter-carriage movable in advance and return directions, a lever for uncoupling said mechanisms, a pawl on said lever, cam-devices on said typewriter-carriage, which, by means of said pawl, actuate said uncoupling lever, and means on said typewriter-carriage whereby said lever may be actuated independently of said pawl.

11. In a combined typewriter-mechanism and perforator-mechanism, the combination of a typewriter-carriage movable in advance and return directions, a lever for uncoupling said mechanisms, a pawl on said lever, said lever working against spring-pressed means which normally keep said mechanisms coupled, cam-devices on said typewriter-carriage, which, by means of said pawl, actuate said uncoupling lever, and means on said typewriter-carriage whereby said lever may be actuated independently of said pawl.

12. In a combined typewriter-mechanism and perforator-mechanism, the combination of a typewriter-carriage movable in advance and return directions, a lever for uncoupling said mechanisms, a one-way pawl on said lever, spring-pressed means which normally keep said mechanisms coupled, cam-devices on said typewriter-carriage, which, by means of said pawl, intermittently operate said uncoupling lever during the advance movement of said typewriter-carriage, but which cam-devices divert said pawl, causing it to be ineffective as an operating connection between said uncoupling lever and said cam-devices during the return movement of said typewriter-carriage, and means whereby said uncoupling lever may be operated independently of said pawl in the return movement of said typewriter-carriage, and whereby said pawl may be caused to reassume its effective operating connection relative to said lever and cam-devices when diverted by any part of said cam-devices.

13. In a combined typewriting and perforating machine having a reciprocatory typewriter-carriage and a reciprocatory denomination-determining perforator-carriage, typewriter-keys to operate said typewriter-carriage, and perforator-mechanism including digit-selecting devices controlled by said keys, the combination with a device for positively coupling said carriages together to enable one carriage to drive the other for joint operation of the typewriter and digit-selecting mechanisms, of means brought into action by the typewriter-carriage and effective upon the coupling means for automatically disconnecting and reconnecting said carriages.

14. In a combined typewriting and perforating machine having a reciprocatory typewriter-carriage and a reciprocatory denomination-determining perforator-carriage, typewriter-keys to operate said typewriter-carriage, and perforator-mechanism including digit-selecting devices controlled by said keys, the combination with a device for positively coupling said carriages together to enable one carriage to drive the other for joint operation of the typewriter and digit-selecting mechanisms, of means brought into action by the typewriter-carriage and effective upon the coupling means for automatically disconnecting and reconnecting said carriages, and concomitantly silencing and rendering active the digit-selecting mechanism.

15. In a combined typewriting and perforating machine having a reciprocatory typewriter-carriage and a reciprocatory de-nomination-determining perforator-carriage, typewriter-keys to operate said typewriter-carriage, and perforator-mechanism including digit-selecting devices controlled by said keys, the combination with a device for positively coupling said carriages together to enable one carriage to drive the other for joint operation of the typewriter and digit-selecting mechanisms, of means brought into action by the typewriter-carriage and effective upon the coupling means for automatically disconnecting and reconnecting said carriages, and concomitantly silencing and rendering active said digit-selecting mechanism in a succession of zones during the typing of a single line.

16. In a combined typewriting and perforating machine having a reciprocatory typewriter-carriage and a reciprocatory denomination-determining perforator-carriage, typewriter-keys to operate said typewriter carriage, and perforator-mechanism including digit-selecting devices controlled by said keys, the combination with a device for positively coupling said carriages together to enable one carriage to drive the other for joint operation of the typewriter and digit-selecting mechanisms, of means including means embodied in or upon the typewriter-carriage and effective upon the coupling means as the carriage travels in predetermined zones, for automatically disconnecting and reconnecting said carriages and concomitantly silencing and rendering active the digit-selecting mechanism.

17. In a combined typewriting and perforating machine, the combination of a reciprocatory typewriter-carriage movable in letter-feeding steps, a reciprocatory denomination-determining perforator-carriage movable in denomination-selecting steps differing in extent from said letter-feeding steps, typewriter-keys to operate said typewriter-carriage, perforator-mechanism including digit-selecting devices controlled by said keys, and a device for positively coupling said carriages together whereby the typewriter-carriage, moving in letter-feeding steps, drives the perforator-carriage in steps of denomination-selecting extent for joint operation of the typewriter and digit-selecting mechanisms.

18. In a combined typewriting and perforating machine, the combination of a reciprocatory typewriter-carriage movable in letter-feeding steps, a reciprocatory denomination-determining perforator carriage, movable in denomination-selecting steps differing in extent from said letter-feeding steps, typewriter-keys to operate said typewriter-carriage, perforator-mechanism including digit-selecting devices controlled by said keys, a device for positively coupling said carriages together whereby the typewriter-carriage, moving in letter-feeding steps, drives the perforator-carriage in steps of denomination-selecting extent for joint operation of the typewriter and digit-selecting mechanisms, and means brought into action by the typewriter-carriage, and effective upon the coupling means for automatically disconnecting and reconnecting said carriages.

19. In a combined typewriting and perforating machine having a reciprocatory typewriter-carriage, and a reciprocatory denomination-determining perforator-carriage, typewriter-keys to operate said typewriter-carriage, and perforator-mechanism including digit-selecting devices controlled by said keys, the combination with a device for positively coupling said carriages together to enable one carriage to drive the other for joint operation of the typewriter and digit-selecting mechanisms, of means brought into action by the typewriter-carriage and effective upon the coupling means for automatically disconnecting and reconnecting said carriages and concomitantly silencing and rendering active the digit-selecting mechanism, and manually-operable means whereby the coupling means may be conditioned and set to disconnect said carriages and silence the digit-selecting mechanism for the purpose of using the typewriter-mechanism alone in regular typing.

20. In a combined typewriting and perforating machine, the combination of a reciprocatory typewriter-carriage, a reciprocatory denomination-determining perforator-carriage, typewriter-keys to operate said typewriter-carriage, perforator-mechanism including digit-selecting devices controllable by said keys, and a manually-operable device for positively coupling said carriages together to enable one carriage to drive the other for joint operation of the typewriter and digit-selecting mechanisms and for concomitantly enabling said keys to control the digit-selecting mechanism, said manually-operable device being used to connect the typewriter and perforator mechanisms for their joint operation, or to disconnect said mechanisms when the typewriter-mechanism is to be used alone.

21. In a combined typewriting and perforating machine having a reciprocatory typewriter-carriage and a reciprocatory denomination-determining perforator-carriage, typewriter-keys to operate said typewriter-carriage, and perforator-mechanism including digit-selecting devices, the combination with a device for positively coupling said carriages together to enable one carriage to drive the other carriage, and electro-mechanical means in an electric circuit controlled by said coupling device whereby the typewriter-keys may operate the digit-selecting mechanism, of means brought into action by the typewriter-carriage and effective upon the coupling means for automatically disconnecting and reconnecting said carriages and concomitantly breaking and making said circuit.

22. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said perforator-mechanism also including punch-indexing devices, said typewriter-mechanism including type-keys and a carriage, of coupling means for positively driving the perforator-carriage by the typewriter-carriage whereby both carriages are controlled by said type-keys, connections to enable said type-keys to operate said punch-indexing devices, and means dependent upon the typewriter-carriage movements for automatically uncoupling and recoupling said carriages and concomitantly disabling and restoring the connections between the type-keys and punch-indexing devices in predetermined zones in the advance movement of the typewriter-carriage.

23. A machine consisting of a typewriter and a perforator, said perforator including a denomination-selecting carriage and a nest of punches for numerous denominations, each denomination having a set of digit-punches, the typewriter including type-keys and a carriage, the perforator also including punch-indexing devices controlled by said type-keys, means controlled by said type-keys and including positive carriage-coupling means to cause said carriages to move step by step in unison dependent upon the typewriter-carriage movements, and means whereby the joint movement of said carriages and the control by said type-keys of said punch-indexing devices are automatically suspended and resumed at predetermined intervals during the typing of a line.

24. A machine having typewriting elements including type-keys and a letter-feeding carriage controlled by said keys, perforating elements including a denomination-selecting carriage and a nest of punches for numerous denominations, each denomination having a set of digit-punches, said perforating elements also including punch-indexing devices controlled by said type-keys, means for positively coupling said carriages whereby both carriages move step by step in unison under the control of said type-keys, means depending upon the typewriter-carriage movements for automatically uncoupling and recoupling said carriages at predetermined intervals during the typing of a line, and means co-operating with said coupling and uncoupling means whereby the control by the type-keys of the punch-indexing devices is automatically rendered effective or ineffective during the aforesaid predetermined intervals.

25. In a combined typewriting and perforating machine, the combination with typewriter-mechanism and perforator-mechanism, said perforator-mechanism including a denomination-selecting carriage and a nest of punches for numerous denominations, each denomination having a set of digit-punches, said typewriter-mechanism including type-keys and a carriage, both of said carriages controlled by said type-keys, said perforator-mechanism also including punch-indexing devices controlled by said type-keys, of uncoupling and recoupling means whereby the typewriter-mechanism and the perforator-mechanism may be disconnected for operation of said typewriter-mechanism alone, or whereby said mechanisms may be reconnected for resumption of their joint operation, and means embodied in or upon said typewriter-carriage whereby said uncoupling and recoupling means are automatically conditioned and sustained for operation of the typewriter-mechanism alone or for said joint operation, by and during the movement of said typewriter-carriage into, in and out of predetermined zones.

26. In a combined typewriting and perforating machine, the combination with typewriter-mechanism and perforator-mechanism, said perforator-mechanism including a denomination-selecting carriage movable in denomination-selecting steps, and a nest of punches for numerous denominations, each denomination having a set of digit-punches, said typewriter-mechanism including type-keys and a carriage movable in letter-feeding steps differing in extent from said denomination-selecting steps of the denomination-selecting carriage, of means for positively coupling said carriages whereby both of said carriages are controlled by said type-keys and whereby said typewriter-carriage, while moving in steps of letter-spacing extent, drives and moves said denomination-selecting carriage in steps of denomination-selecting extent, said perforator-mechanism also including punch-indexing devices controlled by said type-keys and the perforator-carriage.

27. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said typewriter-mechanism including type-keys and a carriage, said perforator-mechanism also including punch-indexing devices controlled by said type-keys, of means for positively coupling said carriages including automatic uncoupling and recoupling means controlled by the movement of said typewriter-carriage whereby, in predetermined zones of said movement, said carriages are uncoupled and positively recoupled and the control by said type-keys of said punch-indexing devices is concomitantly suspended and restored, and manually-operable means whereby said automatic uncoupling and recoupling means may be conditioned and set for the purpose of using said typewriter-mechanism alone in regular typing.

28. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said typewriter-mechanism including type-keys and a carriage, said perforator-mechanism also including punch-indexing devices controllable by said type-keys, of manually-operable means whereby said carriages may be positively coupled or uncoupled and whereby the control by said type-keys of said punch-indexing devices may be concomitantly established or suspended, said manually-operable means being used to connect the typewriter and perforator-mechanisms for joint operation or to disconnect said typewriter and perforator mechanisms when the typewriter-mechanism is to be used alone.

29. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said typewriter-mechanism including type-keys and a carriage, both of said carriages controlled by said keys, said perforator-mechanism also including punch-indexing devices, of electro-mechanical means whereby said type-keys may actuate said punch-indexing devices, and means whereby the movement of said typewriter-carriage into and out of predetermined zones causes said electro-mechanical means to become operative or inoperative for actuating said punch-indexing devices in said zones.

30. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said typewriter-mechanism including type-keys and a carriage, both of said carriages controlled by said type-keys, said perforator-mechanism also including punch-indexing devices, of electrically-operated means included in an electric circuit, whereby said typewriter-keys may operate said punch-indexing devices, and means whereby said electric circuit is automatically made or broken by the movement of said typewriter-carriage into and out of predetermined zones, causing said type-keys to be effective or ineffective to operate said punch-indexing devices in said zones.

31. In a combined typewriting and perforating machine, the combination with a typewriter-mechanism and a perforator-mechanism, said perforator-mechanism including a denomination-selecting carriage and a nest of punches for numerous denominations, each denomination having a set of digit-punches, said typewriter-mechanism including type-keys and a carriage controlled thereby, of means positively coupling said carriages, enabling both of said carriages to be controlled by said type-keys, said perforator-mechanism also including punch-indexing devices, electrically-operated means included in an electric circuit whereby said type-keys control said punch-indexing devices, and means whereby said carriage-coupling means are automatically connected and disconnected and whereby also said electric circuit is concomitantly made or broken by the movement of said typewriter-carriage into and out of predetermined zones.

32. The combination of a typewriter having a carriage, a perforator having a carriage, each carriage movable in advance and return directions, positive carriage-coupling means for positively driving one carriage from the other carriage for joint operation of the typewriter and perforator mechanisms, and means controlling the carriage-coupling means for automatically suspending and resuming the joint movement of said carriages in predetermined zones in the advance movement of the typewriter-carriage.

33. In a combined typewriting and perforating machine having typewriter and perforator carriage, the combination of coupling means for positively driving the perforator-carriage from the typewriter-carriage for joint operation of the typewriter and perforator mechanisms, means for automatically disconnecting and reconnecting the perforator-carriage from and to the typewriter-carriage, and means to prevent displacement of the perforator-carriage while disconnected from the typewriter-carriage.

34. In a combined typewriting and perforating machine having typewriter and perforator carriages, each carriage movable in advance and return directions, the combination of a rack on each carriage, a pair of pinions, one for each of said racks, means including a lever for disconnecting and reconnecting said pinions, and means associated with said lever for engaging means connected to the perforator-carriage for preventing displacement of the perforator-carriage when said perforator-carriage pinion and typewriter-carriage pinion are disconnected.

35. In a combined typewriting and perforating machine having typewriter and perforator carriages, each carriage movable in advance and return directions, the combination of a rack on each carriage, a pair of pinions, one for each of said racks, means including a lever for disconnecting and reconnecting said pinions, and spring-pressed means on said lever for engaging notches associated with the perforator-carriage pinion for holding the same when said perforator-carriage pinion and typewriter-carriage pinion are disconnected, said means on said lever being spring-pressed to permit said lever to be moved independently of said spring-pressed means.

36. The combination of typewriter-mechanism including a carriage, perforator-mechanism, means for connecting or disconnecting said typewriter and perforator mechanisms for joint operation or suspension thereof, and means on the typewriter-carriage controlling said connecting means, said connecting means being controlled solely by said controlling means on said typewriter-carriage so that the movement of said carriage into and out of predetermined zones automatically causes suspension or resumption of the joint operation of the typewriter and perforator mechanisms.

37. The combination of typewriter-mechanism including a carriage movable step by step in an advance direction, perforator-mechanism including a carriage also movable step by step in an advance direction, means connecting said mechanisms for joint operation including means positively coupling said carriages for joint movements in advance and return directions, a single escapement-mechanism for effecting the step-by-step movements of both carriages, and means controlled by the movement of the typewriter-carriage for automatically uncoupling or recoupling said carriages at predetermined intervals in the movements of the typewriter-carriage.

38. The combination of a typewriter-mechanism including a carriage movable in advance and return directions, a perforator-mechanism including a carriage movable in advance and return directions which are opposite to the similar directions of movement of the typewriter-carriage, means positively coupling said carriages for joint movements in opposite directions, and means controlled by the movement of the typewriter-carriage into and out of predetermined zones for automatically uncoupling and recoupling said carriages at predetermined intervals in the movement of said typewriter-carriage, said uncoupling and recoupling being concomitant with automatic suspension and resumption of joint operation of said mechanisms.

39. In a combined typewriting and perforating machine, the combination with a feedable typewriter-carriage, typing keys operative to feed said typewriter-carriage, and a punching mechanism including feedable digit-selecting devices, of electro-mechanical means in a perforator-mechanism electric circuit, whereby said typing keys may operate the digit-selecting devices, and positive means carried by the carriage of the typewriter, whereby said electrical circuit is automatically controlled by the feeding movement of said typewriter-carriage through predetermined typing zones, thereby causing said typing keys to be effective to type in any zone and ineffective to operate the digit-selecting devices in predetermined zones.

40. An apparatus for typing data along a line on a work-sheet and simultaneously indexing punching elements included in said apparatus, preparatory to the perforating operation of all of the indexed or pre-set punching elements simultaneously, the selected punching elements thereby being rendered effective to punch a card to record said data therein after the typing is finished, said punching elements arranged in numerous denominations, said apparatus also including means for automatically controlling the punch-indexing means and thereby including some predetermined portions and excluding other predetermined portions of said typed line of data from said card, said controlling means operating to automatically initiate, suspend and resume the indexing or setting up of said punching elements at predetermined intervals in the typing of said line, said controlling means including carriage-actuated column-selecting means whereby only portions of the line of typed data are selected and punched in the card.

41. An apparatus including a feedable typewriter-carriage, for typing a line of data on a work-sheet and simultaneously setting up card-punching elements feedable with the carriage, said punching elements thereby becoming effective to punch a card to record certain data therein after the typing of a line is finished, said punching elements arranged in numerous denominations, said apparatus also including selectively settable and interchangeable means enabling said typewriter-carriage in its feeding movement through predetermined typing zones to variably and automatically exclude portions of said line of data from said card predetermined by said means, said zone-selecting means including tappets having varying zone-areas and variably disposed longitudinally of the carriage-feed.

42. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices, the combination of means to enable typewriter-keys to select said punch-indexing devices preparatory to punching said work-card after the typing of the line on the main work-sheet, said punch-indexing means having varying denominations and including denomination-determining means for progressively indexing and accumulating successive denominations at the operation of said step-by-step feeding member, and means co-operative with said step-by-step feeding member for silencing said denomination-determining means in a predetermined zone of travel of said feeding member and for restoring the progression of said denomination-determining means in another predetermined zone of travel of said feeding member, so that typing upon the main work-sheet may be accompanied by the setting-up and accumulation of corresponding punch-indexing devices of the same values and denominations as characters typed upon the main work-sheet by said keys in the effective zones.

43. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices, the combination of means to enable typewriter-keys to select said punch indexing devices preparatory to punching said work-card after the typing of the line on the main work-sheet, said punch-indexing means having numerous denominations and including denomination-determining means for progressively indexing and accumulating successive denominations at the operation of said step-by-step feeding member, means co-operative with said step-by-step feeding member for silencing said key-controlled punch-selecting mechanism in a predetermined zone of travel of said feeding member, and to restore said selecting mechanism in another predetermined zone of travel of said feeding member whereby typing upon the main work-sheet is accompanied by the setting-up of corresponding punch-selecting elements in the effective zones, and means to arrest and restore the progression of the denomination-determining means concomitantly with the silencing and restoration of the punch-selecting mechanism, so that, in the effective zone, the typing keys index punch-selectors of the same values and denominations as the characters typed upon the main work-sheet by said keys.

44. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices, the combination of means to enable typewriter-keys to select said punch-indexing devices preparatory to punching said work-card after the typing of the line on the main work-sheet, said punch-indexing means having numerous denominations and including an indexing device movable from denomination to denomination at the operation of said step-by-step feeding member, means embodying a series of alternate elevations and depressions moving in unison with the step-by-step feeding member, and means controlled by said elevations and depressions whereby said key-controlled punch-selecting mechanism is silenced in predetermined zones of travel of said feeding member, and whereby said selecting mechanism is restored in other predetermined zones of travel of said feeding member, so that typing upon the main work-sheet is accompanied by accumulating corresponding set-up punch-indexing devices to be subsequently operated to punch holes in the card.

45. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices arranged in numerous denominations, the combination of means, including electromagnets under the control of typewriter keys, to enable said typewriter-keys to select said punch-indexing devices in successive denominations preparatory to punching said work-card after the typing of the line on the main work-sheet, and means cooperative with said step-by-step feeding member for silencing said key-controlled punch-selecting mechanism in a predetermined zone of travel of said feeding member and to restore said selecting mechanism in another predetermined zone of travel of said feeding member, whereby typing upon the main work-sheet is accompanied by the accumulation of set-up punch-selectors to subsequently punch the card corresponding to the effective zones along the line of typing.

46. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices, arranged in numerous denominations, the combination of means, including electromagnets under the control of typewriter-keys, to enable said typewriter-keys to select said punch-indexing devices in successive denominations preparatory to punching said work-card after the typing of the line on the main work-sheet, and means co-operative with said step-by-step feeding member for silencing said key-controlled punch-selecting mechanism in a predetermined zone of travel of said feeding member and to restore said selecting mechanism in another pre-determined zone of travel of said feeding member, whereby typing upon the main work-sheet is accompanied by accumulation of set-up punch-selectors to subsequently punch the card corresponding to the effective zones along the line of typing, said means which are co-operative with the step-by-step feeding member including means for establishing the control of said electromagnets by said typewriter-keys or rendering said control inoperative concomitantly with the silencing or restoring of said punch-selecting mechanism.

47. In a combined typewriting and card-punching apparatus for typing upon a main work-sheet and subsequently punching corresponding holes in another work-sheet or card, said apparatus including a typewriting mechanism having a step-by-step feeding member under the control of keys and also having means for typing a line of data upon the main work-sheet, said apparatus also including a punching mechanism having a set of punch-indexing devices, arranged in numerous denominations, the combination of means, including electromagnets under the control of typewriter-keys, to enable said typewriter-keys to select said punch-indexing devices in successive denominations preparatory to punching said work-card after the typing of the line on the main work-sheet, and means co-operative with said step-by-step feeding member, whereby the control by said typewriter-keys of said electromagnets is established in a predetermined zone of travel of said feeding member, and whereby said control is rendered inoperative in another predetermined zone of travel of said feeding member so that typing upon the main work-sheet is automatically accompanied by the setting-up and accumulation of corresponding punch-indexing devices preparatory to punching the card.

48. In a combined typewriting and punching apparatus for typing upon a main work-sheet and punching corresponding holes in another work-sheet or card, said apparatus including a typing mechanism having a step-by-step feeding member under the control of keys, and also having means for typing a line of data upon the main work-sheet, said apparatus also including a set of punch-selecting devices arranged in varying denominations, the combination of means to enable typing keys to select corresponding card-punch-selecting devices in successive denominations during the typing of a line on a main work-sheet, and means co-operative with said step-by-step feeding member for silencing said key-controlled punch-selecting devices in a predetermined zone of travel of said feeding member and for restoring said selecting devices in another predetermined zone of travel of said feeding member, whereby typing upon the main work-sheet is accompanied by an accumulation of the punch-selecting devices having corresponding values and denominations.

49. In a combined typewriting and punching apparatus for typing upon a main work-sheet and punching corresponding holes in another work-sheet or card, the combination of a typing mechanism having a step-by-step feeding member under the control of keys, and also having means for typing data along a line upon the main work-sheet, a set of punch-selecting devices arranged in varying denominations, and means to enable typing keys to set corresponding card-punch-selecting devices in successive denominations during the typing on a main work-sheet, said setting means including means for conditioning said key-controlled punch-selecting devices to render the same effective or ineffective, and also including a perforation-controlling device moving in unison with said step-by-step feeding member, said controlling device engaging and being disengaged from said conditioning means in predetermined zones of travel of said feeding member to thereby render said punch-selecting devices effective or ineffective, so that typing upon the main work-sheet may be abbreviated in selecting the punch-selecting devices of corresponding values and denominations while typing characters of predetermined denominations along said work-sheet.

50. In a combined typewriting and punching apparatus for typing upon a main work-sheet and punching corresponding holes in another work-sheet or card, said apparatus including a typing mechanism having a step-by-step feeding member under the control of keys, and also having means for typing a line of data upon the main work-sheet, said apparatus also including a set of punch-selecting devices arranged in varying denominations, the combination of means to enable typing keys to select corresponding card-punch-selecting devices in successive denominations during the typing of a line on a main work-sheet, means for conditioning said key-controlled punch-selecting devices to render the same effective or ineffective, and a perforation-controlling device forming part of said step-by-step feeding member, said controlling device engaging and being disengaged from said conditioning means in predetermined zones of travel of said feeding member to thereby render said punch-selecting devices effective or ineffective, so that typing upon the main work-sheet may be abbreviated in selecting the punch-selecting devices of corresponding values and denominations while typing characters of predetermined denominations along said work-sheet.

51. In a combined typewriting and card-punching apparatus for typing upon a main work-sheet and punching corresponding holes in another work-sheet or card, said apparatus including a typing mechanism having a step-by-step feeding member under the control of keys and also having means for typing a line of data upon the main work-sheet, said apparatus also including a set of punch-selecting devices arranged in numerous denominations, the combination of means, including electrical devices, to enable typing keys to select corresponding punch-selecting devices of successive denominations during the typing of the line on the main work-sheet, said electrical devices included in a main operating circuit, means including a series of alternate elevations and depressions feedable with the step-by-step feeding member, a device for opening and closing said main circuit, and means controlled by said elevations and depressions, whereby said key-controlled punch-selecting devices are silenced in predetermined zones of travel of said feeding member and are restored in other predetermined zones of said feeding member, whereby the circuit closing and opening device is concomitantly actuated and typing upon the main work-sheet is accompanied by the selection of corresponding punch-selecting devices only in the effective zones.

52. In a combined typewriting and card-punching machine, the combination with a letter-feeding typewriter-carriage and a punch-selecting mechanism having an individual carriage for determining denominations, of releasable means for connecting said carriages so that the typewriter-carriage drives the carriage of the punch-selecting mechanism, and means under the control of the typewriter-carriage for controlling the operations of said carriage-connecting means.

53. In a combined typewriting and card-punching machine, the combination with a feedable typewriter-carriage and a punch-selecting carriage operatively connected to travel in unison therewith, of means carried by the typewriter-carriage and operating automatically during the course of its travel, to sever said connection and silence the punch-selecting carriage.

54. In a combined typewriting and card-punching machine, the combination with a feedable typewriter-carriage and a punch-selecting carriage operatively connected to travel in unison therewith, of means carried by the typewriter-carriage and operating automatically during the course of its travel, to interrupt the travel of the punch-selecting carriage for a non-punching interval predetermined by said means.

55. In a combined typewriting and card-punching machine, the combination with a feedable typewriter-carriage and a punch-selecting carriage operatively connected to travel in unison therewith, of means carried by the typewriter-carriage and operating automatically during the course of its travel, to interrupt the travel of the punch-selecting carriage to establish non-punch-setting zones of varying areas in the typed line.

56. In a combined typewriting and card-punching machine, the combination with a feedable typewriter-carriage and a punch-selecting carriage operatively connected to travel in unison therewith, of means carried by the typewriter-carriage and operating automatically during the course of its travel, to interrupt the travel of the punch-selecting carriage to establish non-punch-setting zones of varying areas in the typed line, and then become operative to restore the punch-selecting carriage for a joint feeding movement of both carriages to type and set a punch in a new zone established by the feeding of the typewriter-carriage.

57. In a combined typewriting and card-punching machine, the combination with a feedable typewriter-carriage and a punch-selecting carriage operatively connected to travel in unison, of means carried by the typewriter-carriage and operating automatically during the course of its travel in typing, to sever the connection between the two carriages for a predetermined typing interval and an interrupted punch-setting interval.

58. In a combined typewriting and card-punching machine, the combination with a feedable typewriter-carriage and a punch-selecting carriage operatively connected to travel in unison therewith, of a zone-determining tappet feedable with the typewriter-carriage and operative to establish a non-punch-setting zone in the typing line to arrest the feed of the punch-selecting carriage.

59. In a combined typewriting and card-punching machine, the combination with a feedable typewriter-carriage and a punch-selecting carriage operatively connected to travel in unison therewith, of a series of zone-determining tappets having variable scopes, adjustable characteristics, and movable with the typewriter-carriage to establish a succession of non-punch-setting zones in the typing line to variably arrest the feed of the punch-selecting carriage.

60. In a combined typewriting and card-punching machine, the combination with a feedable typewriter-carriage and a punch-selecting carriage interruptively connectible to travel in unison with the typewriter-carriage, of means for interrupting the travel of the punch-selecting carriage during the travel of the typewriter-carriage, said means including an adjustable non-punch-selecting tappet feedable with the carriage.

61. In a combined typewriting and card-punching machine, the combination with a typewriter-carriage having a feeding mechanism and a punch-selecting carriage having no feeding mechanism, of motion-conveying mechanism intermediate the two carriages whereby the punch-selecting carriage is feedable in unison with the typewriter-carriage, and means automatically operative during the travel of the typewriter-carriage to render said motion-conveying mechanism inoperative to feed the punch-selecting carriage.

62. In a combined typewriting and card-punching machine, the combination with a typewriter-carriage having a feeding mechanism and a punch-selecting carriage having no feeding mechanism, of motion-conveying mechanism intermediate the two carriages whereby the punch-selecting carriage is feedable in unison with the typewriter-carriage, and zone-establishing tappets automatically operative during the travel of the typewriter-carriage to render said motion-conveying mechanism inoperative to feed the punch-selecting carriage.

63. In a combined typewriting and card-punching machine, the combination with a typewriter-carriage having a feeding mechanism and a punch-selecting carriage having no feeding mechanism, of motion-conveying mechanism intermediate the two carriages whereby the punch-selecting carriage is feedable in unison with the typewriter-carriage, and carriage-controlling tappets, individually operative to establish a non-punch-setting zone, and operating in pairs to establish a punch-setting zone between two adjoining tappets.

64. In a combined typewriting and card-punching machine, the combination with a feedable typewriter-carriage and a punch-selecting carriage, of interruptive driving connections between the one carriage and the other carriage that normally feed both carriages in unison, and means automatically operative at a predetermined point in the typing travel of the typwriter-carriage to prevent the joint feeding of the two carriages.

65. In a combined typewriting and card-punching machine, the combination with a feedable typewriter-carriage and a punch-selecting carriage, of interruptive driving connections between one carriage and the other carriage that normally feed both carriages in unison, and means automatically operative at a predetermined point in the typing travel of the typewriter-carriage to prevent the joint feeding of the two carriages, said means being adjustable for regulating the predetermined point where the interruption of the punch-selecting carriage-feed shall take place.

66. In a combined typewriting and card-punching machine, the combination with a feedable typewriter-carriage and a punch-selecting carriage of interruptive driving connections between one carriage and the other carriage that normally feed both carriages in unison, and plural means automatically operative at predetermined points in the travel of the typewriter-carriage to successively interrupt the feeding of the punch-selecting carriage, said means being adjustable to vary the predetermined points and predetermine the typing intervals the punch-selecting carriage-feed shall become inactive.

67. In a combined typewriting and card-punching machine, the combination with a feedable typewriter-carriage having a tabulating mechanism and a punch-selecting carriage operatively connected with the typewriter-carriage to travel in unison therewith, of means carried by the typewriter-carriage and operating automatically during a tabulating movement of the typewriter-carriage to establish conditions that operate to type and selectively set up punches, or to type and not set up punches according to a predetermined plan.

68. In a combined typewriting and card-punching machine, the combination with a typewriter-carriage and a punch-selecting mechanism including a separate carriage normally connectible to be fed by the typewriter-carriage, of means for affording a continuous step-by-step feed for the typewriter-carriage and a predetermined intermittent feed for the punch-selecting carriage.

69. In a combined typewriting and card-punching machine, the combination with a typewriter-carriage and a punch-selecting mechanism including a separate carriage normally connectible to be fed by the typewriter-carriage, of means for affording a continuous step-by-step feed for the typewriter-carriage and a predetermined intermittent feed for the punch-selecting carriage, said means including a succession of tappets feedable with the typewriter-carriage and variably adjustable thereto, to time the punch-selecting position to the typing characteristics of a single line.

70. In a combined typewriting and card-punching machine, the combination with a typewriter-carriage and a punch-selecting mechanism including a separate carriage normally connectible to be fed by the typewriter-carriage, of means for affording a continuous step-by-step feed for the typewriter-carriage and a predetermined intermittent feed for the punch-selecting carriage, said means including a series of tappets longitudinally alignable to the typewriter-carriage and forming a work-controlling pattern of alternate projections and depressions operative to determine the time and the place where the machine shall become operative to type or to type and select punches.

71. In a combined typewriting and card-punching machine, the combination with a feedable typewriter-carriage, a punch-selecting carriage operatively connected to travel in unison with the typewriter-carriage, and a punch-selecting mechanism, of means carried by the typewriter-carriage and operating automatically during the course of its travel in typing, to sever said connection with the punch-selecting carriage and simultaneously silence the punch-selecting mechanism for a typing interval predetermined by said means.

72. In a combined typewriting and card-punching machine, the combination with a feedable typewriter-carriage, a punch-selecting carriage operatively connected to travel in unison with the typewriter-carriage, and a punch-selecting mechanism, of means carried by the typewriter-carriage and operating automatically during the course of its travel in typing, to sever said connection with the punch-selecting carriage, effect the locking of said selecting carriage, and simultaneously silence the punch-selecting mechanism for a typing interval predetermined by said means.

73. In a combined typewriting and perforating machine for typing a line of data on a worksheet and concomitantly causing perforations to be effected in a card to record in said card predetermined portions of said line of data, other portions of said line, as it is typed, to be excluded from said card, the combination with a typewriter-mechanism including type-keys and a carriage controlled by said keys, and perforator-mechanism including punching devices, of electro-mechanical means included in an electric circuit, whereby the operation of any type-key actuates corresponding punching devices to cause the card to be punched, a switch included in said circuit and operable to break and restore said circuit, and a member on said typewriter-carriage having cam-projections which, in the advance movement of said typewriter-carriage, are effective to open said switch, said cam-projections being proportioned and disposed so that said switch is, by means of said projections, automatically caused to be open at predetermined intervals, and thereby intermit the actuation of the punching devices while portions of the line of data to be excluded from the card are being typed.

74. In a combined typewriting and perforating machine for typing a line of data on a worksheet and concomitantly causing perforations to be effected in a card to record in said card predetermined portions of said line of data, other portions of said line, as it is typed, to be excluded from said card, the combination with a typewriter-mechanism including type-keys and a carriage controlled by said keys, and perforator-mechanism including punching devices, of electro-mechanical means included in an electric circuit, whereby the operation of any type-key actuates corresponding punching devices to cause the card to be punched, a switch included in said circuit and operable to break and restore said circuit, and a series of cam-projections arranged along said typewriter-carriage, said cam projections being effective, in the advance movement of said typewriter-carriage, to open said switch, and being proportioned and disposed so that said switch is, by means of said projections, automatically caused to be open at predetermined intervals, and thereby intermit the actuation of the punching devices while the portions of the line of data to be excluded from the card are being typed.

75. In a combined typewriting and card-punching machine, the combination with a typewriter-carriage and a punch-indexing carriage, of a carriage-control mechanism connectible with both carriages, including a control unit operative to convert the positive continuous feed for one carriage into an interrupted feed for the other carriage.

76. In a combined typewriting and card-punching machine, the combination with a typewriter-carriage and a punch-indexing carriage, of a carriage-control mechanism connectible with both carriages, including a control unit operative to convert the positive continuous feed for one carriage into an interrupted feed for the other carriage, said mechanism including a transmittive unit operative to intermittently convey motion from one carriage to the other carriage during the typing of a line.

77. In a combined typewriting and card-punching machine, the combination with a typewriter-carriage and a punch-indexing carriage, of a carriage-control mechanism connectible with both carriages, including a control unit operative to convert the positive continuous feed for one carriage into an interrupted feed for the other carriage, said mechanism including a train of connections between the carriages, and means mounted upon one carriage and co-operative with said train to intermittently drive and disconnect the other carriage during the typing of a line.

78. In a combined typewriting and card-punching machine, the combination with a typewriter-carriage and a punch-indexing carriage, of a carriage-control mechanism connectible with both carriages, including a control unit operative to convert the positive continuous feed for one carriage into an interrupted feed for the other carriage, said mechanism including a train of connections between the carriages, means upon one carriage co-operative with said train to disconnect the other carriage, and other means upon one carriage operative to lock the disconnected carriage during its non-feedable interval.

79. In a combined typewriting and card-punching machine, the combination with a typewriter-carriage and a punch-indexing carriage, of a carriage-control mechanism connectible with both carriages, including a control unit operative to convert the positive continuous feed for one carriage into an interrupted feed for the other carriage, said mechanism including a train of connections between the carriages, a control unit mounted upon one carriage and co-operative with said train to intermittently drive and disconnect the other carriage during the typing of a line, and other means operative to lock the disconnected carriage during its idle interval.

80. In a combined typewriting and card-punching machine, the combination with a power-driven typewriter-carriage having a platen for typing and a punch-indexing carriage having punch-indexing pins settable by the typing keys, of mechanism connecting the two carriages for a joint feeding movement, including means mounted upon the typewriter-carriage and operating automatically during the course of its travel, to interrupt the continuous feed of the punch-indexing carriage and simultaneously prevent the operation of indexing the punch-selecting pins by the keys.

81. In a combined typewriting and card-punching machine, the combination with a power-driven typewriter-carriage having a platen for typing and a punch-indexing carriage having punch-indexing pins settable by the typing keys, of mechanism connecting the two carriages for a joint feeding movement, and a controller on the typewriter-carriage having fixed characteristics predetermined according to the form of the work-sheet and operative to interrupt the continuous feed of the punch-indexing carriage, lock said carriage in its interrupted position, and simultaneously prevent the setting of the punch-indexing pins by the keys in typing.

82. In a combined typewriting and card-punching machine, the combination with a power-driven typewriter-carriage having a feeding mechanism controlled by the typing keys and a punch-indexing carriage having punch-indexing pins settable by solenoids in a circuit closed by the keys in typing, of a switch normally operative to close the circuit to the pin-indexing solenoids, and means on the typewriter-carriage operative during the travel thereof in typing, to operate the switch and open the solenoid-circuit, to prevent the setting of the punch-indexing pins when a key is depressed in typing.

83. In a combined typewriting and card-punching machine, the combination with a power-driven typewriter-carriage having a feeding mechanism controlled by the typing keys and a punch-indexing carriage having punch-indexing pins settable by solenoids in a circuit closed by the keys in typing, of a switch normally operative to close the circuit to the pin-indexing solenoids, and means on the typewriter-carriage operative during the travel thereof in typing, to control the operation of the switch and render the keys operative or inoperative to type and index punches simultaneously.

84. In a combined typewriting and card-punching machine, the combination with a power-driven typewriter-carriage and a co-operative punch-indexing carriage, of a punch-controlling bar carried by the typewriter-carriage including a series of members having characteristics for automatically effecting the travel of the punch-indexing carriage, to render the feed of said carriage operative or inoperative according to the form of the work sheet.

85. In a combined typewriting and card-punching machine, the combination with a power-driven typewriter-carriage and a carriage having a key-operated punch-indexing mechanism, of mechanism connecting the two carriages for a joint feeding movement, including means detachably mounted upon the typewriter-carriage and operating automatically during the course of its travel, to interrupt the continuous feed of the punch-indexing carriage at predetermined intervals along the line of typing.

86. In a combined typewriting and card-punching machine, the combination with a power-driven typewriter-carriage and a carriage having a key-operated punch-indexing mechanism, of mechanism connecting the two carriages for a joint feeding movement, including a controller on the typewriter-carriage operating automatically during the course of its travel, to interrupt the continuous feed of the punch-indexing carriage, said controller including a means operative to simultaneously lock the punch-indexing carriage during the interruption in its feed.

87. In a combined typewriting and card-punching machine, the combination with a power-driven typewriter-carriage and a carriage having a key-operated punch-indexing mechanism, of mechanism connecting the two carriages for a joint feeding movement including a controller on the typewriter-carriage operating automatically during the course of its travel, to interrupt the continuous feed of the punch-indexing carriage, said controller including a means operative to simultaneously lock the punch-indexing carriage during the interruption in its feed, said controller also including means operative to prevent the actuation of the punch-indexing mechanism by the keys during the interruption in the feed of the punch-indexing carriage.

88. In a combined typewriting and card-punching machine, the combination with a power-driven typewriter-carriage feedable letter-space distances of fixed extent, of connections operative to simultaneously drive a punch-indexing carriage punch-spacing distances of greater extent, including a controller on the typewriter-carriage co-operative with said connections during the continuous typing of a line, to index equivalent punched records upon a card of lesser extent than the typed record.

89. In a combined typewriting and perforating machine, the combination with a typewriter-carriage, typing keys operative to feed said carriage, and a perforator-mechanism having digit-selecting devices and means for determining the denomination of the digit-selecting device, the combination of means to enable the typewriter-keys to actuate the digit-selecting mechanism, and mechanism dependent upon the movement of the typewriter-carriage into and out of predetermined typing zones, for automatically causing said keys to become operative or inoperative to actuate said digit-selecting mechanism.

90. A combined typewriting and card-punching apparatus for typing upon a main work-sheet and subsequently punching corresponding holes in another work-sheet or card, said apparatus including, in combination, a typewriting mechanism having a step-by-step feeding member under the control of keys and also having means for typing data along a line upon the main work-sheet, a punching mechanism having a set of punch-indexing devices, and means to enable typewriter-keys to set said punch-indexing devices selectively preparatory to punching said work-card after the typing on the main work-sheet, said setting means including means co-operative with said step-by-step feeding member for controlling said selecting mechanism to render the same effective in one predetermined zone of travel of said feeding member, and ineffective in another predetermined zone of travel of said feeding member, whereby typing upon the main work-sheet is accompanied by the setting-up of corresponding punch-indexing devices only in the effective zone.

91. In a combined typewriting and card-punching apparatus for typing upon a main work-sheet and subsequently punching corresponding holes in another work-sheet or card, the combination of typewriting mechanism having a step-by-step feeding member under the control of keys and also having co-operative means for typing a line of data upon the main work-sheet, a punching mechanism having a set of punch-indexing devices, and means to enable typewriter-keys to set said punch-indexing devices selectively preparatory to punching said work-card after the typing on the main work-sheet, said setting means including controlling means co-operative with said step-by-step feeding member for rendering said selecting mechanism ineffective in one predetermined zone of travel of said feeding member, and calling it into action in another predetermined zone of travel of said feeding member, whereby typing upon the main work-sheet is accompanied by the setting up of corresponding punch-indexing devices only in the effective zone, said punch-indexing devices having varying denominations, and said setting means being progressively effective upon successive denominations at the operation of said step-by-step feeding member in an effective zone, so that the typing keys index and accumulate punch-selectors of the same values and denominations as the characters typed upon the main work-sheet by said keys to become a set-up punch-operating unit to subsequently perforate the card.

92. In a combined typewriting and card-punching machine, the combination with a power-driven typewriter-carriage, of connections to mechanically feed a punch-indexing carriage, including a control unit removably secured to the typewriter-carriage and operative to predetermine the sequence and duration of a series of nonfeeding intervals for the carriage-feed punch-indexing carriage.

93. In the combination of a recording mechanism comprising a carriage and a punching mechanism; means for causing a set-up to be made in the punching mechanism as a set-up is made in the recording mechanism, a bar supported on said carriage for movement therewith, and means on the bar for controlling the effectivity of said set-up causing means.

94. In the combination of a recording mechanism comprising a carriage and a punching mechanism; means for causing a set-up to be made in the punching mechanism as a set-up is made in the recording mechanism, a bar mounted for movement with said carriage, and cams of different lengths on said bar for controlling the effectivity of said set-up causing means for variable extents of time.

95. The combination with a recording machine comprising a carriage and a key board; of punches, an electromagnet for each punch for controlling it for operation, a circuit closer for each key to energize a magnet when its corresponding key is depressed, a common circuit closer for all of said magnets, and a bar movable with said carriage for opening and closing said common circuit closer for predetermined positions of the carriage.

96. The combination with a recording machine comprising a carriage and a key board; of punches, an electromagnet for each punch for controlling it for operation, a circuit closer for each key to energize a magnet when its corresponding key is depressed, a common circuit closer for all of said magnets, and a bar movable with said carriage and provided with cams for opening and closing said common circuit closer for predetermined positions of the carriage.

97. The combination with a recording machine comprising a carriage and a key board; of punches, an electromagnet for each punch for controlling it for operation, a circuit closer for each key to energize a magnet when its corresponding key is depressed, a common circuit closer for all of said magnets, and a bar movable with said carriage and provided with cams of different lengths for opening and closing said circuits for different positions of the carriage and for maintaining said circuits opened and closed for different extents of movement of said carriage.

98. In the combination of a recording machine having a carriage, and a card-perforating machine controlled by said recording machine; means traveling with the carriage of the recording machine for repeatedly making and breaking the connection to the perforating machine.

99. In the combination of a recording machine having a carriage, and a card-perforating machine, means for causing a set-up to be made in the perforating machine as matter is being recorded in the recording machine, and means carried by the carriage of the recording machine for disabling the aforesaid means so as to prevent the perforated card from forming a record of a predetermined portion of the matter recorded after the carriage has performed its function in the recording of other matter.

100. In the combination of a recording machine having a carriage, and a card-perforating machine, a system of punches in the perforating machine, punch-selecting devices, and actuating means which comprises relatively movable components mounted on the recording machine and by which desired action and inaction of those devices are made dependent on motion imparted to one of those components by the carriage of the recording machine.

101. In the combination of a recording machine having a carriage, and a card-perforating machine, a system of punches in the perforating machine, and means to predetermine that a card-record of certain matter which is recorded by the recording machine and of which a card-record is not wanted shall not be punched, said means having relatively movable components mounted on the recording machine and its action being dependent on movements imparted to one of those components by the carriage of the recording machine.

102. In the combination of a recording machine having a carriage, and a card-perforating machine, a system of punches in the perforating machine, and means which comprises relatively movable components mounted on the recording machine and by which the punching of a record of matter recorded in any predetermined field on a record sheet is made dependent on motion imparted to one of said components by the carriage of the recording machine.

103. In the combination of a recording machine having a carriage, and a card-perforating machine, a system of punches in the perforating machine, and means which comprises a component mounted on the frame and another component mounted on and extending across the carriage of the recording machine and by which means the punching of a record of matter recorded in any predetermined field on a record sheet is made dependent on movement with the carriage of the latter component and its action on the other.

104. In the combination of a recording machine having a carriage, and a card-perforating machine, a system of punches in the punching machine, and means which comprises a component mounted on the frame and another component mounted on and extending across the carriage of the recording machine, the latter component including formations corresponding to different fields in which matter is recorded on a record-sheet, and by which means punching of a record of matter recorded in any predetermined field wherever on the sheet that field may be is made avoidable.

105. In the combination of a recording machine having a carriage, and a card-perforating machine, a system of punches in the perforating machine and means which comprises a component mounted on the frame and another component mounted on the carriage of the recording machine, one of these components crossing the other and being approximately as long as the carriage is wide and including formations corresponding to different fields in which matter is recorded on a record-sheet, and by which means the punching of a record of matter recorded in any predetermined field wherever on the record-sheet that field may be is made avoidable.

106. In the combination of a recording mechanism comprising a carriage, and a punching mechanism; means for causing the punching mechanism to be actuated concomitantly with actuation of the recording mechanism, a bar adapted to move in unison with said carriage, and high and low points on said bar operative to determine and control effectivity and non-effectivity of said punching-mechanism-actuation-causing means.

107. In a combined typewriting and card-perforating machine, the combination of a typewriting mechanism having a typing-carriage, a card-perforating mechanism for perforating a card to correspond with matter typed by the typewriting mechanism, and means controlled by said typing-carriage for rendering the perforating mechanism operative when the typing-carriage is in one or more predetermined typing zones, and for rendering the perforating-mechanism inoperative when the typing-carriage is in one or more other predetermined typing zones.

108. In associated typing and perforating mechanisms, the typing mechanism including types and a platen relatively movable to determine typing in different places or zones of a work-sheet, means adapted to insure the control of the perforating mechanism in accordance with a plan of differential operation of the two mechanisms, said means including devices automatically operative, under control of different predetermined relative positions of the types and platen consequent upon their relative movements, to render the perforating mechanism active in conjunction with the typing mechanism, or inactive while the latter continues to operate.

109. In a combined typewriting and card-perforating machine, the combination of a typewriting mechanism having types and a device movable to register different work-sheet zones with the types, a card-perforating mechanism for perforating a card to correspond with matter typed by the typewriting mechanism, and means acting differentially, under control of said movable device according to its positions consequent to its movements, for automatically rendering the perforating mechanism operative in conjunction with typing in one or more predetermined work-sheet zones, and for automatically rendering the perforating mechanism inoperative in conjunction with typing in one or more other predetermined work-sheet zones.

110. The combination with a typing mechanism having types and also having a carriage, or the like, shiftable to place the typing at different zones of a work-sheet; a card-perforating mechanism having punches for punching in different zones of a record card, of connections rendered effective or ineffective by the typing-carriage according to its shifts, to determine that operation of corresponding punches results from operation of said types for a predetermined work-sheet zone or zones, or to determine non-operation of the punches relative to operation of said types for another predetermined work-sheet zone or zones, and means controlled by said typing-carriage, to coordinate the card zones at which the operation of said punches takes place, with the corresponding typing-and-punching zones of said work-sheet.

ALFRED G. F. KUROWSKI.
JESSE A. B. SMITH.